United States Patent Office 3,007,663
Patented Nov. 7, 1961

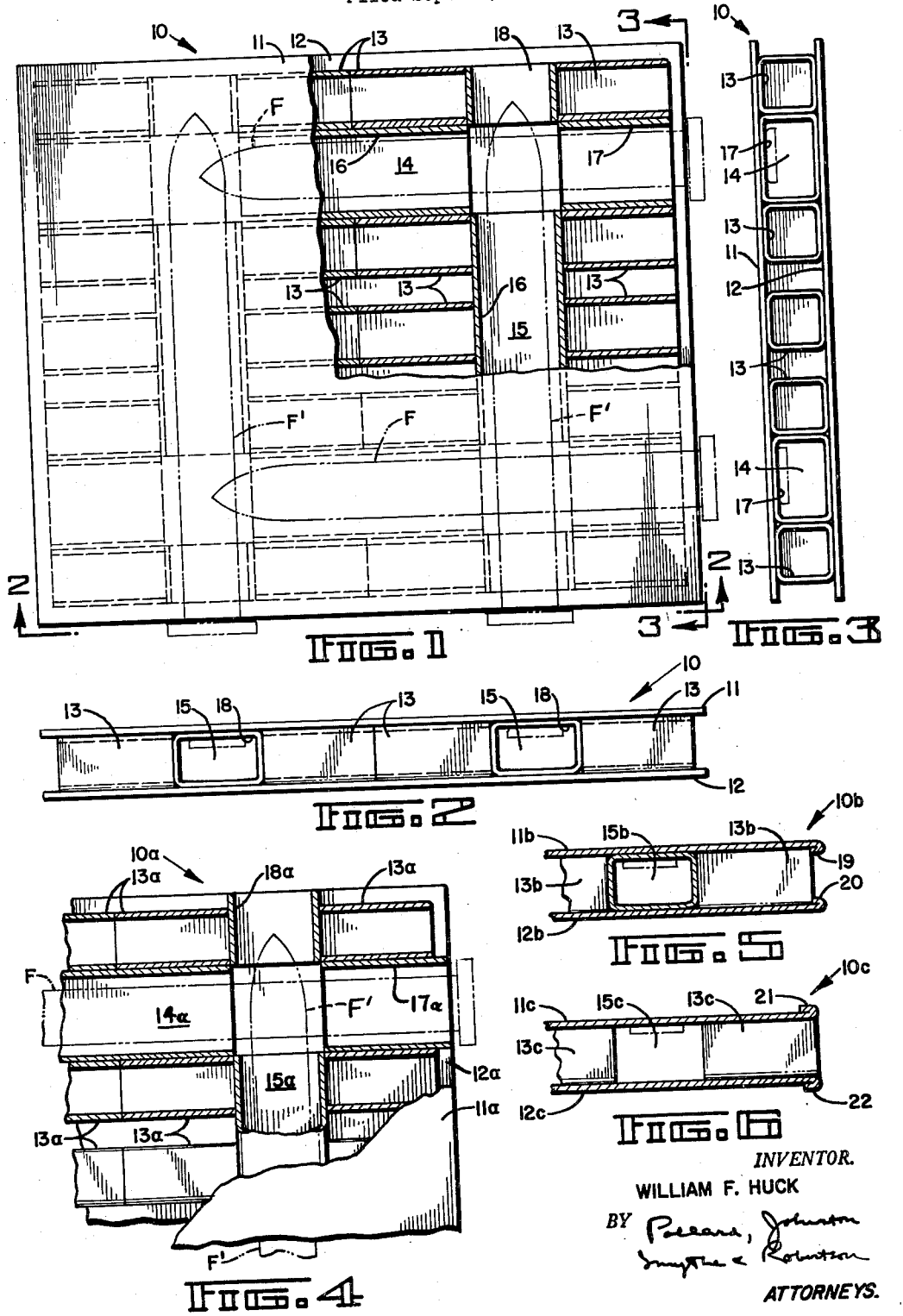

3,007,663
DISPOSABLE PALLETS
William F. Huck, Forest Hills, N.Y., assignor to Huck Products Corporation, New York, N.Y., a corporation of New York
Filed Sept. 4, 1959, Ser. No. 838,218
11 Claims. (Cl. 248—120)

This invention relates generally to pallets, that is low, portable platforms, usually double-faced, on which materials are stacked for storage or transportation, as in a warehouse.

Existing pallets of the described character have been usually constructed of wood or metal and, by reason of the use of such materials, are heavy, cumbersome and relatively expensive so that they are not economically disposable. Since these pallets are usually used to transfer materials from a source of supply, such as, a factory, processing plant or the like, to a consumer or distributor, it is often necessary to unload the pallets at the point of delivery in order to permit the return of the relatively expensive pallets to the source of supply. However, the additional labor costs involved in unloading the relatively expensive pallets merely to permit the return of the latter has increased the total cost of handling materials with these pallets. Furthermore, the costs and bother involved in the return of the pallets are additional disadvantages inherent in the use of relatively expensive, and hence not conveniently disposable pallets.

In order to overcome the above mentioned disadvantages of the existing pallets of wood or metal construction, it has been proposed to employ pallets made of corrugated paper board or the like which are low enough in cost and of suitable construction and material as to be readily disposable at the destination of the materials stored or transported on such pallets. However, these proposed pallets have lacked the strength of the previously existing pallets of wooden or metal construction and have collapsed under severe stacking conditions, that is, when a series of loaded pallets are stacked one upon the other so as to impose large bearing loads on the lowermost pallet. Further, the proposed pallets of corrugated paper board or the like have failed in bending, for example, when subjected to large overhanging loads such as those encountered during the lifting and transporting of the loaded pallet by a fork-lift truck, particularly in the case where the long edges of the pallet are parallel to the lifting forks.

Accordingly, it is an object of this invention to provide pallets of a light, inexpensive, and hence readily disposable material, for example, a stiff paper-pulp material, such as, corrugated cardboard, paper board or the like, which are so constructed as to have the necessary strength for resisting the direct compressive or bearing loads, as well as the bending stresses resulting from overhung loads, of the magnitude that may be encountered in the use of such pallets.

Another object is to provide disposable pallets made of simple standardized units which are easily assembled together to ensure the requisite compressive and bending strengths.

In accordance with this invention, a pallet is constructed with generally flat top and bottom decks of a stiff paper-pulp material, such as corrugated cardboard, paper board or the like, which are held in spaced-apart, parallel relationship by a large number of tubular reinforcing spacer members having rectangular cross-sections, which members also are formed of a stiff paper-pulp material, such as corrugated cardboard, paper board or the like, and the rectangular tubular members have their upper and lower surfaces adhesively secured to the decks and are arranged so that some of them extend perpendicularly to others and so that certain ones of them, which ones have their sides adhesively secured to contiguous vertical surface portions of others of the tubular members, form parallel passages between the decks for receiving and bearing the thrust of the forks of a fork-lift truck or the like that may be used to raise and transport the pallet.

The above, and other objects, features and advantages of the invention will be apparent in the following detailed description of illustrative embodiments thereof which is to be read in connection with the accompanying drawing forming a part hereof, and wherein:

FIG. 1 is a top plan view, partly broken away and in section, of a pallet constructed in accordance with one embodiment of the present invention;

FIG. 2 is a side elevational view of the pallet shown in FIG. 1;

FIG. 3 is an end elevational view of the pallet shown in FIG. 1;

FIG. 4 is a fragmentary top plan view, partly broken away and in section, and illustrating a modification of the structural arrangement of the pallet shown in FIG. 1;

FIG. 5 is a fragmentary side elevational view of a pallet similar to that of FIG. 2, but showing another embodiment of the invention; and FIG. 6 is a fragmentary side elevational view, similar to that of FIG. 5, but showing still another embodiment of the invention.

Referring to the drawing in detail, and initially to FIGS. 1, 2 and 3 thereof, it will be seen that a pallet constructed in accordance with the present invention, and there generally identified by the reference numeral 10, includes generally flat upper and lower decks 11 and 12, respectively, which are usually rectangular and are formed of a stiff paper-pulp material, such as, corrugated cardboard, paper board or the like.

The decks 11 and 12 are maintained in parallel, spaced apart relationship, by a multitude of tubular reinforcing spacer members 13, 16, 17 and 18, which are also formed of a stiff paper-pulp material, such as, corrugated cardboard, paper board or the like, and which have rectangular cross-sections. The tubular reinforcing spacer members have their flat upper and lower surfaces adhesively secured such as by glue, to the confronting surfaces of decks 11 and 12 so as to form a unitary structure with the latter in which the numerous vertical side walls of the tubular members serve in effect as I-beams interconnected as a unit through the spaced decks so as to give the whole structure great resistance to compressive loads, shearing loads and bending stresses.

Some of the tubular members, such for example as either of the two pairs of parallel members 16 in the arrangement of FIGS. 1 to 3, have open ends accessible from outside the pallet and are shaped and spaced apart horizontally between the decks so as to form fork-receiving passages 14 or 15 which will receive freely and sustain the thrust of lifting forks, of a fork-lift truck or the like, inserted horizontally into those members. These parallel passage forming members 16 are each flanked at either side thereof by others of the tubular members, such for example as various members 13, and their vertical side walls are adhesively secured, such as by glue, to the contiguous vertical surfaces of such other members, so that heavy loads applied to the upper deck will be well distributed over and sustained by the pallet structure while it is being supported by the lifting forks, whether the loads are distributed evenly or are concentrated between the forks or are concentrated on a cantilevered portion of the structure outside the fork passages.

Furthermore, the various tubular members are arranged between the decks in a pattern in which some of them extend in a direction perpendicular to the longitudinal axes of others of them. In this way a very considerable enhancement of strength and resistance to bending stresses and to shearing or collapsing stresses in any direction is given to the pallet structure. In the embodiment of FIGS. 1 to 3, there are parallel sets of aligned spaced tubular members 16 and 17 extending longitudinally within the structure together with parallel sets of aligned spaced tubular members 16 and 18 extending transversely therewithin.

The longitudinally extending tubular members 16 form the central or main body portions of the longitudinal fork-receiving passages 14, which passages in the illustrated embodiments are accessible from either end of the pallet, and the transversely extending tubular members 16 form the central or main body portions of the transverse fork-receiving passages 15 which are accessible from either side of the pallet. The members 17 and 18 define end portions of the respective passages outside the intersections of the passages. By virtue of this arrangement the pallet structure not only is provided with the desired enhanced strength but also is made so that it can be conveniently lifted and transported on forks inserted into it from any one of its four lateral sides.

The above described arrangement or pattern of reinforcing spacer tubes 13, 16, 17 and 18 in cooperation with decks 11 and 12 to which such tubes are adhesively secured, provides great compressive and bending strength in a light-weight structure of corrugated cardboard, paperboard or other readily disposable material. It employs standardized units for the manufacture of the pallet, for example, the several tubular members 13 may be cut from the same tubular stock, and the broader tubular members 16, 17 and 18 may be cut from the same tubular stock. Further, the described structure provides within the strongly bonded tubes 16, 17 and 18 the passages 14 and 15 which are adapted to receive the forks of a work-lift truck at either end edge of the pallet, as indicated at F, or at either side edge of the pallet, as indicated at F'.

In the pallet illustrated in FIGS. 1, 2 and 3, the edges of decks 11 and 12 project beyond the outermost members 13 and also beyond the outer ends of the reinforcing tubes 17 and 18. However, as shown in FIG. 4, where the several parts of the pallet 10a there illustrated are identified by the same reference numerals employed above in the description of the pallet 10, but with the letter "a" appended thereto, the tubes 17a and 18a at the entrance portions of passages 14a and 15a, respectively, may be extended to the transverse and longitudinal edges, respectively, of the decks 11a and 12a, thereby to reinforce or stiffen the overhanging edges of the decks.

If desired, as shown in FIG. 5, the projecting edges of the top and bottom decks 11b and 12b of a pallet 10b embodying the invention may be strengthened or provided with reinforcing flanges, as indicated at 19 and 20, by folding under and cementing the edge of top deck 11b and by folding up and cementing the edge of lower deck 12b. Alternatively, as indicated in a view of a pallet 10c in FIG. 6, the edges of top and bottom decks 11c and 12c may be strengthened by folding back and gluing the entire projecting edge portion of each deck, so that such edges are then flush with the ends of the tubular spacers 13c appearing at the opposite ends of the pallet and with the outer side surfaces of the tubular spacers 13c appearing at the opposite longitudinal edges of the pallet. In the arrangement illustrated in FIG. 6, the edge portion of top deck 11c is folded upwardly, whereas the edge portion of bottom deck 12c is folded downwardly, and such folded edge portions define double thicknesses of deck material along the perimeters of the top and bottom decks, as indicated at 21 and 22, respectively.

If it is desired to provide larger openings for the forks of a lift truck at the entrance portions of the pairs of parallel passages defined within the pallet, the reinforcing tubes 17 and 18 of pallet 10 described with respect to FIGS. 1, 2 and 3, may be eliminated from the structure, as is shown in the case of the passage 15c of the pallet 10c appearing in FIG. 6.

Although illustrative embodiments of the invention have been described in detail herein with reference to the accompanying drawing, it is to be understood that the invention is not limited to those precise embodiments, and that various changes and modifications may be effected therein by a person skilled in the art without departing from the scope or spirit of the invention.

What is claimed is:

1. A portable, disposable pallet comprising a pair of parallel, spaced-apart flat deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, some of said tubular members extending perpendicularly to others of said tubular members, certain of said tubular members being spaced apart in parallel relationship and defining parallel passages extending longitudinally within said certain members and accessible from outside the pallet for the reception of lifting forks of a fork-lift truck or the like.

2. A portable, disposable pallet comprising a pair of parallel, spaced-apart flat deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, some of said tubular members extending perpendicularly to others of said tubular members, certain of said tubular members being spaced part in parallel relationship and defining parallel passages extending longitudinally within said certain members and accessible from outside the pallet for the reception of lifting forks of a fork-lift truck or the like, the upright sides of said certain members being adhesively secured to upright surface portions of others of said tubular members.

3. A pallet as claimed in claim 2, said others of said tubular members being substantially square in cross section, the cross section of each of said certain tubular members being greater in breadth than it is in height.

4. A portable, disposable pallet comprising a pair of parallel, spaced-apart flat deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, certain of said tubular members being formed and arranged to define between said deck members two intersecting pairs of spaced parallel passages extending longitudinally within said certain members and accessible from any of four sides of the pallet for the reception of lifting forks of a fork-lift truck or the like, the tubular members defining one of said pairs extending perpendicularly to the tubular members defining the other of said pairs, the upright sides of said certain members being adhesively secured to upright surface portions of others of said tubular members.

5. A portable, disposable pallet comprising a pair of parallel, spaced-apart flat deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, said tubular members including four such members spaced inwardly from the edges of said deck members in a rectangular pattern with their inner upright sides bordering a rectangular area at the center of said deck members, at least two parallel ones of said four members forming the main body portions of spaced parallel passages extending longitudinally within said parallel members and accessible from outside the pallet to receive lifting forks of a forklift truck or the like, others of said tubular members extending across said rectangular area and presenting upright surface portions adhesively secured to said inner sides of said four members, still others of said tubular members being disposed between the outer upright sides of said four members and the respective adjacent edges of said deck members and having upright surface portions adhesively secured to said outer sides.

6. A portable, disposable pallet comprising a pair of parallel, spaced-apart flat deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, said tubular members including four such members spaced inwardly from the edges of said deck member in a rectangular pattern with their inner upright sides bordering a rectangular area at the center of said deck members, at least two parallel ones of said four members forming the main body portions of spaced parallel passages extending longitudinally within said parallel members and accessible from outside the pallet to receive lifting forks of a fork-lift truck or the like, others of said tubular members extending across said rectangular area and presenting upright surface portions adhesively secured to said inner sides of said four members, still others of said tubular members being disposed between the outer upright sides of said four members and the respective adjacent edges of said deck members and having upright surface portions adhesively secured to said outer sides, each of said passages having opposite end portions defined by tubular members as aforesaid having the same cross section as but shorter than said parallel members.

7. A portable, disposable pallet comprising a pair of parallel, spaced-apart flat deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, said tubular members including four such members formed to receive lifting forks of a fork-lift truck or the like and spaced inwardly from the edges of said deck members in a rectangular pattern with their inner upright sides bordering a rectangular area at the center of said deck members, said four members respectively forming the main body portions of two perpendicularly intersecting pairs of spaced parallel passages extending longitudinally within said four members and accessible to such forks from any of four sides of the pallet, others of said tubular members extending across said rectangular area and presenting upright surface portions adhesively secured to said inner sides of said four members, still others of said tubular members being disposed between the outer upright sides of said four members and the respective adjacent edges of said deck members and having upright surface portions adhesively secured to said outer sides.

8. A portable, disposable pallet comprising a pair of parallel, spaced-apart flat rectangular deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, said tubular members including four such members formed to receive lifting forks of a fork-lift truck or the like and spaced inwardly from the edges of said deck members in a rectangular pattern with their inner upright sides bordering a rectangular area at the center of said deck members, said four members respectively forming the main body portions of two perpendicularly intersecting pairs of spaced parallel passages extending longitudinally within said four members and accessible to such forks from any of four sides of the pallet, others of said tubular members extending across said rectangular area and presenting upright surface portions adhesively secured to said inner sides of said four members, still others of said tubular members being disposed between the outer upright sides of said four members and the respective adjacent edges of said deck members and having upright surface portions adhesively secured to said outer sides, said tubular members also including still others of such members respectively disposed between said deck members at the corner portions of said deck members and adjacent to the end portions of said passages outside the intersections thereof.

9. A portable, disposable pallet comprising a pair of parallel, spaced-apart flat rectangular deck members of stiff paper-pulp material and a multitude of tubular reinforcing spacer members of rectangular cross section disposed between and interconnecting said deck members and also made of stiff paper-pulp material, said rectangular tubular members being adhesively secured over their upper and lower surfaces to said deck members and extending parallel thereto with their upright sides substantially perpendicular to said deck members, said tubular members including four such members formed to receive lifting forks of a fork-lift truck or the like and spaced inwardly from the edges of said deck members in a rectangular pattern with their inner upright sides bordering a rectangular area at the center of said deck members, said four members respectively forming the main body portions of two perpendicularly intersecting pairs of spaced parallel passages extending longitudinally within said four members and accessible to such forks from any of four sides of the pallet, others of said tubular members extending across said rectangular area and presenting upright surface portions adhesively secured to said inner sides of said four members, still others of said tubular members being disposed between the outer upright sides of said four members and the respective adjacent edges of said deck members and having upright surface portions adhesively secured to said outer sides, said tubular members also including still others of such members respectively disposed between said deck members at the corner portions of said deck members and adjacent to the end portions of said passages outside the intersections thereof, said end portions being defined by tubular members as aforesaid having the same cross section as but shorter than said four members, opposite upright sides of each of said shorter members being adhesively secured to upright surface portions of some of said still others of said tubular members.

10. A pallet as claimed in claim 9, said others and said still others of said tubular members each being substantially square in cross section and the cross section of each of said four members and said shorter members being greater in breadth than it is in height.

11. A portable, disposable pallet comprising a pair of parallel, spaced-apart flat rectangular deck members of corrugated paper board and a multitude of tubular reinforcing spacer members of rectangular cross section disposed between and interconnecting said deck members and also made of corrugated paper board, said rectangular tubular members being adhesively secured over their upper and lower surfaces to said deck members and extending parallel thereto with their upright tubular members including four such members formed to receive lifting forks of a fork-lift truck or the like and spaced inwardly from the edges of said deck members in a rectangular pattern with their inner upright sides bordering a rectangular area at the center of said deck members, said four members respectively forming the main body portion of two perpendicularly intersecting pairs of spaced parallel passages extending longitudinally within said four members and accessible to such forks from any of four sides of the pallet, others of said tubular members extending across said rectangular area and presenting upright surface portions adhesively secured to said inner sides of said four members, still others of said tubular members being disposed between the outer upright sides of said four members and the respective adjacent edges of said deck members and having upright surface portions adhesively secured to said outer sides, said tubular members also including still others of such members respectively disposed between said deck members at the corner portions of said deck members and adjacent to the end portions of said passages outside the intersections thereof, said end portions being defined by tubular members as aforesaid having the same cross section as but shorter than said four members, opposite upright sides of each of said shorter members being adhesively secured to upright surface portions of some of said still others of said tubular members.

References Cited in the file of this patent

UNITED STATES PATENTS

| | | |
|---|---|---|
| 2,446,914 | Fallert | Aug. 10, 1948 |
| 2,542,129 | Fletcher | Feb. 20, 1951 |
| 2,559,930 | Bolton | July 10, 1951 |
| 2,576,715 | Farrell | Nov. 27, 1951 |
| 2,664,219 | Schmidt | Dec. 29, 1953 |
| 2,685,398 | King | Aug. 3, 1954 |
| 2,702,642 | Bensinger | Feb. 22, 1955 |